United States Patent [19]

Wright

[11] 4,077,823
[45] Mar. 7, 1978

[54] METHOD OF PRODUCING A GUARDING COVER FOR RACKS AND THE LIKE

[75] Inventor: John T. Wright, Cattaraugus, N.Y.

[73] Assignee: Champion International Corporation, Stamford, Conn.

[21] Appl. No.: 780,848

[22] Filed: Mar. 24, 1977

Related U.S. Application Data

[63] Continuation of Ser. No. 630,299, Nov. 10, 1975.

[51] Int. Cl.² ............................................. B31F 1/00
[52] U.S. Cl. ................................. 156/212; 156/216; 156/226; 156/227; 428/126; 428/313
[58] Field of Search .................. 156/206, 227, 212–214, 156/216–217, 79, 211; 428/313, 126, 130; 29/469.5, DIG. 1; 211/135; 220/9 F

[56] References Cited

U.S. PATENT DOCUMENTS

| | | | |
|---|---|---|---|
| 3,075,862 | 1/1963 | Hoyer | 428/130 |
| 3,251,382 | 5/1966 | Tatsch | 220/9 F |
| 3,284,260 | 11/1966 | Best | 156/212 |
| 3,318,636 | 5/1967 | Callum | 156/212 X |
| 3,647,588 | 3/1972 | Greig | 428/313 X |
| 3,649,398 | 3/1972 | Keith | 156/79 |
| 3,887,101 | 6/1975 | Adachi | 156/211 X |

FOREIGN PATENT DOCUMENTS 2,088,105  7/1972  France ........................ 428/313

Primary Examiner—David A. Simmons
Attorney, Agent, or Firm—Evelyn M. Sommer

[57] ABSTRACT

Method of producing a guarding cover for racks, such as baggage racks in passenger railroad cars. A sandwich is formed by adhesively laminating a foamed blanket layer to a relatively stiff, substantially flat base sheet, which is bendable to different contours for defining varying panel areas and also edge hems. A desired area of this sandwich is selected to form a cover unit and each of one or more edge zones is reversely bent into a hem with the foamed layer protectively arranged on the exterior of the base sheet hem.

3 Claims, 5 Drawing Figures

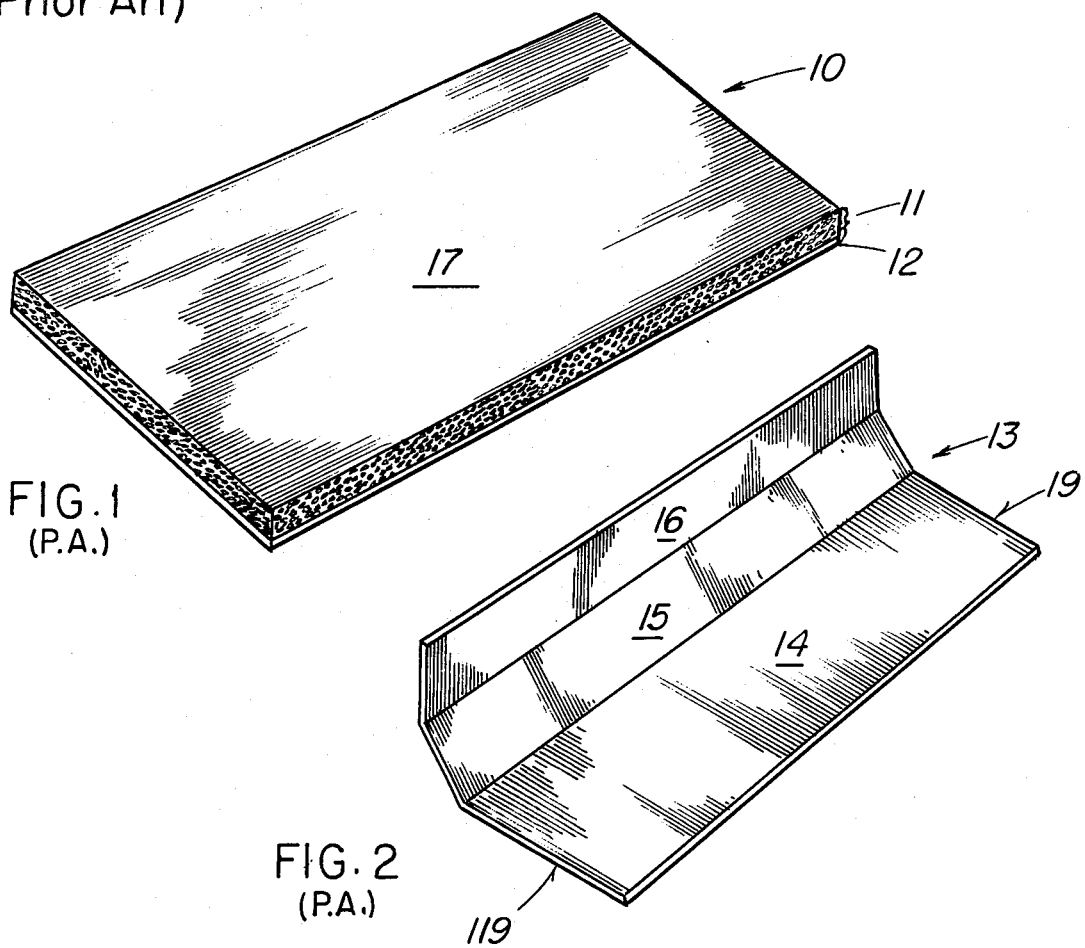
FIG. 1 (P.A.)
FIG. 2 (P.A.)
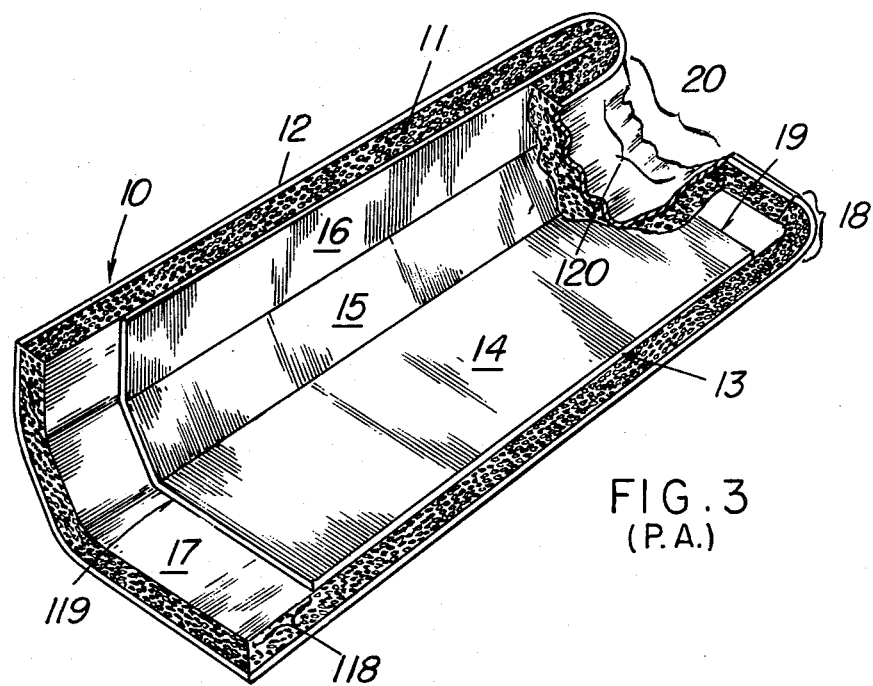
FIG. 3 (P.A.)

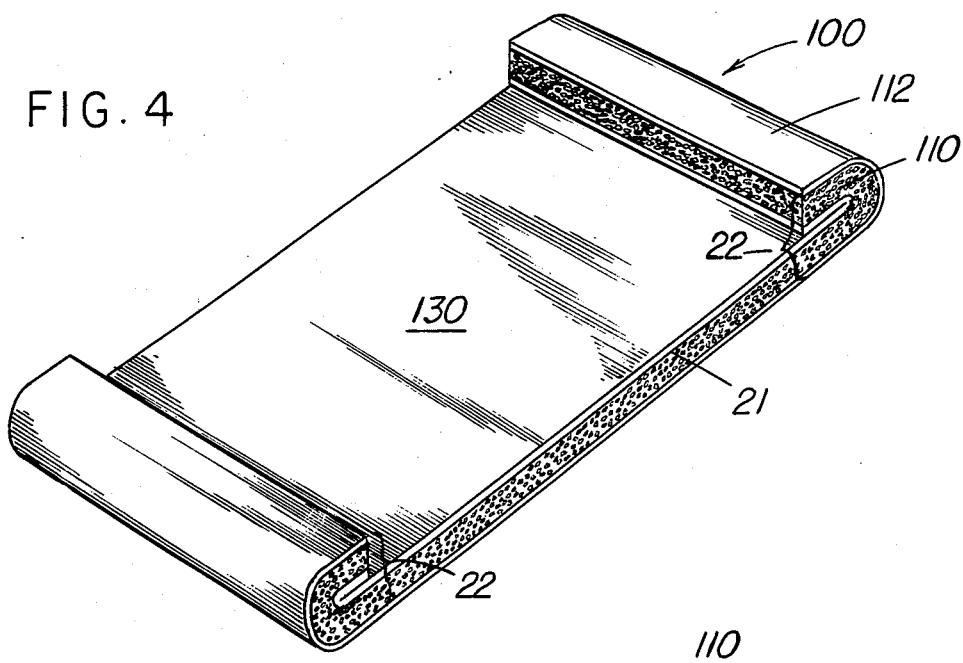
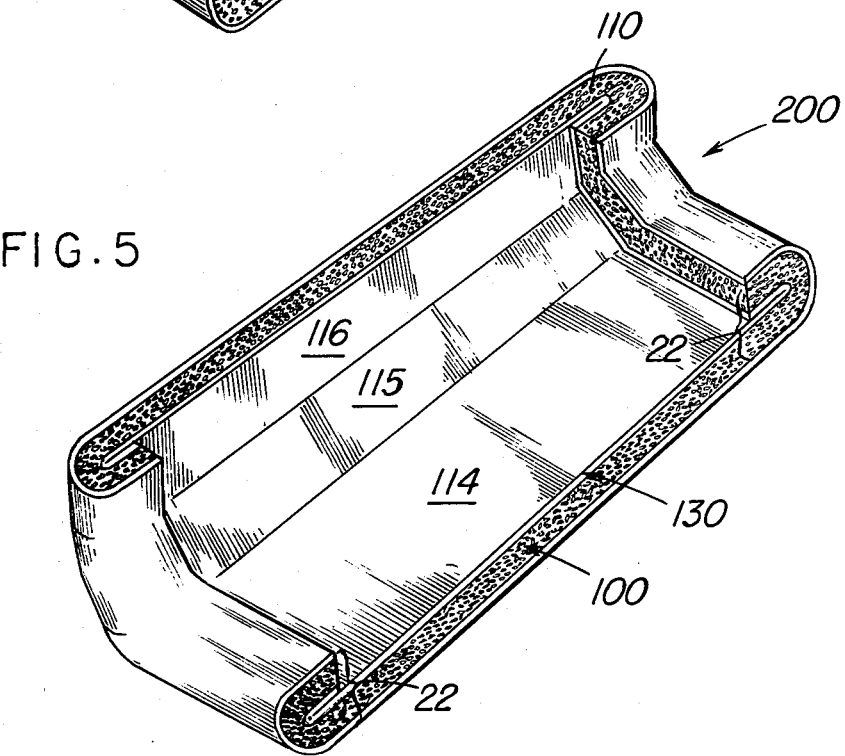

METHOD OF PRODUCING A GUARDING COVER FOR RACKS AND THE LIKE

This is a continuation of application Ser. No. 630,299, filed Nov. 10, 1975.

BACKGROUND AND SUMMARY

This invention concerns a method of producing a guarding cover for racks and the like to pad them effectively for avoiding injury to people and objects when bumped thereagainst.

Prior to the present invention there have been produced and used such guarding covers for the bottom sides of baggage racks in passenger railroad cars. A typical such cover may consist of a rectangular and substantially flat, bendable sheet of suitable metal, e.g., aluminum, constituting a backing sheet, which may be about 5 feet long and about 2 feet wide defined into three successive panels by a pair of longitudinal bend lines. One of these panels or the first thereof may be about 15 inches wide, the next or intermediate one about 6 inches wide, and the third about 3 inches wide. The angles between the upper and inside faces of the first and intermediate panels, and the latter and the third panel may be about 135°. A covering or blanket layer was prepared by adhesively laminating a vinyl sheet to a relatively thick slice of foamed or sponge rubber by hand and the resulting body ply was then handbonded to the outer side faces of the three-panel metal backing sheet. The plural-ply sponge rubber and vinyl sheet blanket layer was appreciably longer than the five feet longitudinal length of the backing sheet, e.g., about a foot, for appreciable lapping back or hemming of the blanket layer about both of the end edges of the backing sheet and adhesively anchoring by hand these lapped back hems thereto. Due to angular relationships of these successive metal panels such hems unavoidably were wrinkled in an unsightly manner and the adhesive anchorages thereof were none too secure since they required the use of heat sensitive adhesives. Such successive hand operations require a high degree of skill and are excessively time consuming, so that such production is quite a costly procedure.

It is a general object of the present invention to provide better guarding covers at much cheaper cost and which are more sightly than such prior covers.

In accordance with the present invention, more desirable and highly serviceable guarding covers, particularly to alleviate hazards of bumping injuries, are producible by a simpler procedure. The foamed blanket layer may be a layer of vinyl foam and it may have an integral face skin that is tough and decoratively textured. The relatively stiff metal base sheet that is bendable to different contours to define panel areas initially is substantially flat. For the same services as the prior guarding covers this base sheet and the blanket layer are of about the same length and about that of the prior base sheet, so that the end edges of the blanket layer ultimately may be hemmed with the end edges of the base sheet. This blanket layer has a bottom face, opposite its outer skin face when the latter is present, that is adhesively laminated to the opposed outer face of the substantially flat base sheet to form a relatively flat sandwich. This sandwich may be relatively large in width and length to have a plurality of the proper size units cut therefrom for finishing each separately as a cover unit. It is a relatively simple procedure to hem one or more edges of such composite cover unit sandwich in a press break with a crushing die to fold the metal backing sheet and the blanket layer carried by it through 180°. The shaping of each of these composite sandwiches and the forming of the one or more composite hems thereof can be done with the use of much less labor, and that required need not be as skilled as that required for the production of each of the prior cover units. Also, the present process permits use of more durable materials and adhesives in the production of such cover units which have better appearance and longer life.

Other objects of the invention will in part be obvious and will in part appear from reference to the following detailed description taken in connection with the accompanying drawings, wherein like numerals indentify similar parts throughout, and in which:

FIGS. 1, 2 and 3 illustrate by perspective views successive steps of a common prior procedure ("Prior Art" or "P.A.") of hand producing such a typical cover unit;

FIG. 4 is a perspective view of a sandwich cover unit produced by the practice of the present invention with opposite end edges hemmed; and FIG. 5 is a perspective view of the finished cover unit after the hemmed sandwich of FIG. 4 is bent longitudinally into the desired three successive panels.

As will be seen from FIG. 1, the composite blanket layer 10 may consist of a relatively thick slice 11 of foamed or sponge rubber or vinyl composition to which is bonded an outer side skin 12 that, in the prior art, may be a vinyl sheet. It is now common practice to produce such a plural foamed or sponge composite sandwich by casing vinyl sheet to foam while on a textured plate so as to provide a textured face skin on a foamed ply layer.

In FIG. 2 is illustrated at 13 the desired prior art base sheet of relatively stiff, bendable material, such as metal, which is bent in a suitable break into three successive panels 14, 15 and 16, that have been angularly arranged relative to each other in the shown manners for producing a desired cover for the underside of a baggage rack in a passenger railroad car. For this purpose this metallic sheet 13 may be about 2 feet wide and about 5 feet long with these successive panels 14, 15 and 16 defined longitudinally and arranged at angles of about 135° apart on the inner side of this shaped base sheet, i.e., about 225° on the outer side faces thereof which is to be blanketed by the protective blanket layer 10, as is shown in FIG. 3.

In adhesively laminating the back face 17 of the foamed blanket 10 to the outer side faces of the base sheet panels 14, 15 and 16, edge zones 18 and 118 of this foamed blanket are to be lapped up and about the opposite end edges 19 and 119 of the base sheet 13. Such a hemming turning through about 180° is illustrated in the right end of FIG. 3 as such hemming is being there performed. This progressive hand hemming is performed with the use of heat sensitive adhesive, so that as the hem is turned by hand the lapped back portion of the hem is adhered to the inside faces of the end zones of the metallic base or backing sheet. It will also be noted from the left side of FIG. 3 that such progressive hand turning of the hem at 20 causes undesirable wrinkling and unevenness in the hem area 120.

It will be observed, by way of contrast, in and understood from FIGS. 4 and 5, that the blanket layer 100 consisting of a foamed vinyl blanket ply 110 having an integral face skin 112 has been laminated to an outer face 21 of relatively stiff base sheet 130, with these sandwich layers being of about equal dimensions. Good bonding of this blanket layer to such base or backing sheet desirably can be effected by the use of adhesives of the polyester, polyether, polyurethane, or epoxy types and may be employed to advantage. Thereafter the opposite end zones of such a composite sandwich are then hemmed together by turning such sandwich end zones through 180°, as illustrated at 22 in FIG. 4, in a press break and with the use therein of a crushing die.

As a final step the resulting structure of FIG. 4 is then pressed into successive longitudinal panels 114, 115 and 116 as is indicated in FIG. 5, so that the resulting cover unit 200 will be adapted with its end hems 22 to fit up over the underside of the railroad car baggage rack. The soft exterior surface of the cushioning blanket layer 100 of thick foam will prevent painful bumps when passengers stand up and occasionally strike their heads against the cushioned baggage rack.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

Particularly it is to be understood that in said claims, ingredients or compounds recited in the singular are intended to include compatible mixtures of such ingredients wherever the sense permits.

What is claimed is:

1. A method for producing a guarding cover for baggage racks comprising:
    adhesively laminating a pre-fabricated foamed blanket layer to a relatively stiff, substantially flat, base sheet to form a sandwich, said blanket layer and base sheet being substantially identical in configuration, said blanket layer forming the exterior surface of said guarding cover;
    reverse bending the longitudinal ends of said sandwich against the base sheet to form two rigid hem portions, said hem portions including first and second foamed layers and two base sheet layers enclosed between said foamed layers; and
    pressing said hemmed sandwich into a plurality of angularly spaced longitudinal panels.

2. The method as defined in claim 1 characterized by providing said foamed blanket layer with a flexible protective surface skin on at least one side and adhesively laminating the opposite side of said layer to said base sheet.

3. The method as defined in claim 1 characterized by selecting the desired area of said sandwich in a size suitable for forming therefrom a bottom side cover unit for a baggage rack in a passenger railroad car to guard passengers against head bumping injury.

* * * * *